United States Patent
Panasyuk et al.

(10) Patent No.: US 6,437,803 B1
(45) Date of Patent: *Aug. 20, 2002

(54) SYSTEM AND METHOD FOR COMBINING LOCAL AND REMOTE WINDOWS INTO A SINGLE DESKTOP ENVIRONMENT

(75) Inventors: Anatoliy Panasyuk, West Ryde; Martin Duursma, West Pennant Hills, both of (AU)

(73) Assignee: Citrix Systems, Inc., Ft. Lauderdale, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,898

(22) Filed: May 29, 1998

(51) Int. Cl.[7] .................................................. G09G 5/00
(52) U.S. Cl. ...................................... 345/733; 345/750
(58) Field of Search ................................ 345/340, 326, 345/329, 332, 339, 302, 333, 330, 331, 781, 744, 759, 717, 740, 733–738, 748, 750, 751, 804, 764, 765

(56) References Cited

U.S. PATENT DOCUMENTS

| | | | |
|---|---|---|---|
| 4,387,425 A | 6/1983 | El-Gohary | 364/200 |
| RE32,632 E | 3/1988 | Atkinson | 340/709 |
| 4,779,189 A | 10/1988 | Legvold et al. | 364/200 |
| 4,860,247 A | 8/1989 | Uchida et al. | 364/900 |
| 4,903,218 A | 2/1990 | Longo et al. | 364/521 |
| 4,937,036 A | 6/1990 | Beard et al. | 340/706 |
| 4,949,281 A | 8/1990 | Hillenbrand et al. | 364/518 |
| 4,958,303 A | 9/1990 | Assarpour et al. | 364/521 |
| 4,974,173 A | * 11/1990 | Stefik et al. | 345/331 |
| 5,031,089 A | 7/1991 | Liu et al. | 364/200 |
| 5,062,060 A | * 10/1991 | Kolnick | 345/339 |

(List continued on next page.)

FOREIGN PATENT DOCUMENTS

| | | |
|---|---|---|
| EP | 0381645 A2 | 8/1990 |
| EP | 0384339 A3 | 8/1990 |

(List continued on next page.)

OTHER PUBLICATIONS

IBM Technical Disclosure Bulletin, "Remote Desktop Environments Reflected in Local Desktop Windows", Mar. 1993.*

Bruce Mann, et al.; *Terminal Servers on Ethernet Local Area Networks;* Digital Technical Journal, No. 3, Sep. 1986; pp. 73–87.

(List continued on next page.)

*Primary Examiner*—Raymond J. Bayerl
*Assistant Examiner*—Tadesse Hailu
(74) *Attorney, Agent, or Firm*—Testa Hurwitz & Thibeault, LLP

(57) ABSTRACT

A system for incorporating windows from remote desktop environments into a local desktop environment includes a local node, a local agent, a first remote node, and a first remote agent. The first remote node provides a first remote desktop environment, and the first remote agent monitors the first remote desktop environment for changes in the environment. The first remote node transmits messages to the local agent indicative of changes in the first remote desktop environment. The local agent receives the transmitted messages and commands the local node to modify a representation of a first remote window that is part of a local desktop environment. The local agent also monitors the local desktop and transmits messages to the remote agent indicative of a change in the local desktop. In some embodiment, the local node provides the local desktop environment. Local agents can be embodied on articles of manufacture.

19 Claims, 5 Drawing Sheets

U.S. PATENT DOCUMENTS

| | | | |
|---|---|---|---|
| 5,072,412 A | 12/1991 | Henderson, Jr. et al. | 395/159 |
| 5,103,303 A | 4/1992 | Shoji et al. | 358/75 |
| 5,119,319 A | 6/1992 | Tanenbaum | 364/514 |
| 5,155,847 A | 10/1992 | Kirouac et al. | 395/600 |
| 5,175,852 A | 12/1992 | Johnson et al. | 395/600 |
| 5,187,790 A | 2/1993 | East et al. | 395/725 |
| 5,202,971 A | 4/1993 | Henson et al. | 395/425 |
| 5,204,897 A | 4/1993 | Wyman | 380/4 |
| 5,231,697 A | 7/1993 | Yamada | 395/142 |
| 5,241,625 A | 8/1993 | Epard et al. | 395/163 |
| 5,247,683 A | 9/1993 | Holmes et al. | 395/700 |
| 5,249,290 A | 9/1993 | Heizer | 395/650 |
| 5,255,361 A * | 10/1993 | Callaway | 345/522 |
| 5,305,440 A | 4/1994 | Morgan et al. | 395/200 |
| 5,309,555 A | 5/1994 | Akins et al. | 395/157 |
| 5,325,527 A | 6/1994 | Cwikowski et al. | 395/650 |
| 5,329,619 A | 7/1994 | Page et al. | 395/200 |
| 5,351,129 A | 9/1994 | Lai | 348/584 |
| 5,367,688 A | 11/1994 | Croll | 395/700 |
| 5,414,457 A | 5/1995 | Kadowaki et al. | 348/14 |
| 5,440,719 A | 8/1995 | Hanes et al. | 395/500 |
| 5,457,797 A | 10/1995 | Butterworth et al. | 395/650 |
| 5,461,608 A | 10/1995 | Yoshiyama | 370/16.1 |
| 5,469,540 A | 11/1995 | Powers, III et al. | 395/158 |
| 5,483,466 A | 1/1996 | Kawahara et al. | 364/514 |
| 5,517,617 A | 5/1996 | Sathaye et al. | 395/200.1 |
| 5,526,492 A | 6/1996 | Ishida | 395/200.09 |
| 5,537,548 A | 7/1996 | Fin et al. | 395/200.04 |
| 5,541,927 A | 7/1996 | Kristol et al. | 370/94.2 |
| 5,553,242 A | 9/1996 | Russell et al. | 395/200.12 |
| 5,557,748 A | 9/1996 | Norris | 395/200.1 |
| 5,561,769 A | 10/1996 | Kumar et al. | 395/200.05 |
| 5,566,302 A | 10/1996 | Khalidi et al. | 395/200.09 |
| 5,572,674 A | 11/1996 | Ernst | 395/200.1 |
| 5,574,934 A * | 11/1996 | Mirashrafi et al. | 709/207 |
| 5,577,208 A * | 11/1996 | Couturier | 345/302 |
| 5,579,469 A | 11/1996 | Pike | 395/326 |
| 5,583,563 A | 12/1996 | Wanderscheid et al. | 348/13 |
| 5,583,992 A | 12/1996 | Kudo | 395/200.03 |
| 5,586,312 A | 12/1996 | Johnson et al. | 395/610 |
| 5,592,626 A | 1/1997 | Papadimitriou et al. | 395/200.09 |
| 5,594,490 A | 1/1997 | Dawson et al. | 348/6 |
| 5,606,493 A | 2/1997 | Duscher et al. | 364/134 |
| 5,619,716 A | 4/1997 | Nonaka et al. | 395/800 |
| 5,644,720 A | 7/1997 | Boll et al. | 395/200.12 |
| 5,680,549 A | 10/1997 | Raynak et al. | 395/200.12 |
| 5,706,437 A | 1/1998 | Kirchner et al. | 395/200.12 |
| 5,708,786 A * | 1/1998 | Teruuchi | 345/340 |
| 5,710,918 A | 1/1998 | Lagarde et al. | 395/610 |
| 5,721,876 A | 2/1998 | Yu et al. | 395/500 |
| 5,726,669 A * | 3/1998 | Obata et al. | 345/2 |
| 5,734,865 A | 3/1998 | Yu | 395/500 |
| 5,737,592 A | 4/1998 | Nguyen et al. | 395/604 |
| 5,742,778 A * | 4/1998 | Hao et al. | 345/332 |
| 5,748,892 A | 5/1998 | Richardson | 395/200.3 |
| 5,754,830 A | 5/1998 | Butts et al. | 395/500 |
| 5,757,925 A | 5/1998 | Faybishenko | 380/49 |
| 5,758,085 A | 5/1998 | Kouoheris et al. | 395/200.61 |
| 5,761,507 A | 6/1998 | Govett | 395/684 |
| 5,764,908 A | 6/1998 | Shoji et al. | 395/200.47 |
| 5,764,915 A | 6/1998 | Heimsoth et al. | 395/200.57 |
| 5,767,849 A * | 6/1998 | Borgendale et al. | 345/335 |
| 5,768,614 A * | 6/1998 | Takagi et al. | 710/1 |
| 5,802,258 A | 9/1998 | Chen | 395/182.08 |
| 5,802,306 A | 9/1998 | Hunt | 395/200.58 |
| 5,812,784 A | 9/1998 | Watson et al. | 395/200.57 |
| 5,819,093 A | 10/1998 | Davidson et al. | 395/704 |
| 5,826,027 A | 10/1998 | Pedersen et al. | 395/200.51 |
| 5,828,840 A | 10/1998 | Cowan et al. | 395/200.33 |
| 5,838,910 A | 11/1998 | Domenikos et al. | 395/200.33 |
| 5,838,916 A | 11/1998 | Domenikos et al. | 395/200.49 |
| 5,844,553 A * | 12/1998 | Hao et al. | 345/329 |
| 5,870,545 A | 2/1999 | Davis et al. | 395/200.31 |
| 5,874,960 A | 2/1999 | Mairs et al. | 345/340 |
| 5,877,757 A | 3/1999 | Baldwin et al. | 345/705 |
| 5,889,942 A | 3/1999 | Orenshteyn | 395/187.01 |
| 5,913,060 A | 6/1999 | Discavage | 395/680 |
| 5,913,920 A * | 6/1999 | Adams | 709/204 |
| 5,923,842 A | 7/1999 | Pedersen et al. | 395/188.01 |
| 5,928,324 A | 7/1999 | Sloan | 709/203 |
| 5,938,733 A | 8/1999 | Heimsoth et al. | 709/230 |
| 5,941,949 A | 8/1999 | Pedersen | 709/227 |
| 5,941,988 A | 8/1999 | Bhagwat et al. | 713/201 |
| 5,944,791 A | 8/1999 | Scherpbier | 709/218 |
| 5,949,975 A * | 9/1999 | Batty et al. | 709/213 |
| 5,951,694 A | 9/1999 | Choquier et al. | 714/15 |
| 5,961,586 A | 10/1999 | Pedersen | 709/201 |
| 5,973,696 A | 10/1999 | Agranat et al. | 345/357 |
| 5,999,179 A | 12/1999 | Kekic et al. | 345/839 |
| 5,999,950 A | 12/1999 | Krueger et al. | 707/535 |
| 6,023,721 A | 2/2000 | Cummings | 709/201 |
| 6,034,689 A | 3/2000 | White et al. | 345/854 |
| 6,108,712 A | 8/2000 | Hayes, Jr. | 709/246 |
| 6,157,944 A | 12/2000 | Pedersen | 709/204 |
| 6,161,126 A | 12/2000 | Wies et al. | 709/203 |

FOREIGN PATENT DOCUMENTS

| | | | | |
|---|---|---|---|---|
| EP | 0414624 A2 | 2/1991 | | 9/46 |
| EP | 475581 * | 8/1991 | | 9/46 |
| EP | 0475581 A2 | 3/1992 | | 9/46 |
| EP | 0540151 A2 | 5/1993 | | |
| EP | 0643514 A3 | 3/1995 | | |
| EP | 0732834 A2 | 9/1996 | | |
| EP | 0767563 A2 | 4/1997 | | 29/6 |
| EP | 0841615 A2 | 5/1998 | | 9/445 |
| EP | 0878759 A1 | 11/1998 | | 9/44 |
| JP | 06125363 | 5/1994 | | |
| WO | 93/15457 A1 | 8/1993 | | |
| WO | 94/14114 | 6/1994 | | |
| WO | 97/28623 A2 | 8/1997 | | |
| WO | 97/28623 A3 | 8/1997 | | |
| WO | WO 97/28623 | 8/1997 | | |
| WO | 98/52320 A2 | 11/1998 | | |

OTHER PUBLICATIONS

Toyoko Abe, et al.; *Distributed Cooperative Control for Sharing Applications Based on the MERMAID Multiparty and Multimedia Desktop Conferencing System;* NEC Research & Development, Jan. 1993; pp. 122–131.

*Application of Equivalent Communication Buffer Sizes in SQLJRA Remote Protocol;* IBM Technical Disclosure Bulletin, vol. 36, No. 1, Jan. 1993; pp. 29–31.

*OS/2 EE Database Manager SQLJRA Remote Protocol;* IBM Technical Disclosure Bulletin, vol. 36, No. 1, Jan. 1993; pp. 33–36.

R. Droms; *Dynamic Host Configuration Protocol;* Network Working Group; Oct. 1993; pp. 1–39.

Richard M. Adler; *Distributed Coordination Models for Client/Server Computing;* Apr. 1995; pp. 14–22.

*IP Multicast Streamlines Delivery of Multicast Applications;* Copyright 1995 © Cisco Systems, Inc.; pp. 1–5.

Shashi Prasad; *Weaving a Thread;* BYTE; Oct. 1995; pp. 173–174.

Andrew Campbell, et al.; *Meeting End–to–End QoS Challenges for Scalable Flows in Heterogeneous Multimedia Environments;* Nov. 9, 1995; pp. 101–115.

*Multicast Routing;* Copyright 1996 © Cisco Systems, Inc.; pp. 1–4.

Peng Liu, et al.; *Efficient Algorithms for Resource Allocation in Distributed and Parallel Query Processing Environments;* pp. 1–5.

Part 1, About Windows NT Networking, Chapter 5, "Windows NT Browser"; pp. 79–87.

"Distributed Cooperative Control for Sharing Applications Based on the MERMAID Multiparty and Multimedia Desktop Conferencing System" by Toyoko Abe, Kazutoshi Maeno, Shiro Sakata and Hideyuki Fukuoka, NEC Research & Development 34 (1993) Jan., No. 1, Tokyo, Japan, pp. 122–131.

* cited by examiner

SYSTEM AND METHOD FOR COMBINING LOCAL AND REMOTE WINDOWS INTO A SINGLE DESKTOP ENVIRONMENT

FIELD OF THE INVENTION

The present invention relates to displaying information on remote computers and, in particular, to a system and method for combining display data received from various remote sources into a single, local display.

BACKGROUND OF THE INVENTION

Client-server systems, in which a user of a client node is typically remote from a server which provides application processing or access to files and other resources, are both convenient and cost-effective. Client nodes are generally cheaper than servers, and since one server typically provides services to more than one client, overall system cost is reduced. Additionally, client-server systems allow an enterprise to make decisions regarding the location of certain system resources (such as applications) on a situational basis. For example, certain applications may be resident solely on clients, solely on servers, solely on certain servers, or any combination of the above which improves the overall efficiency of the system.

To date, however, efforts to combine output data from various sources into a single display have not met with success. For example, early attempts have been made to cause server-based applications to write directly into local windows. Although this method can display application output from various servers on a single display, it lacks the ability to arrange the windows on the client responsive to the z-axis ordering of the windows at each individual server. Thus, if a server brings a new window to the top of its desktop, no corresponding change appears to the user at the client.

Further, systems typically cannot support combining various sources of data into a single display without modification of the applications generating output data. This results because most enterprises desire to use off-the-shelf software to generate output data and such software does not support combination of output data. This represents a practical problem because re-writing such applications to support output combination is generally prohibited by the manufacturer of such software and, even if not prohibited, can be expensive.

SUMMARY OF THE INVENTION

The present invention relates to a system in which multiple data displays can be represented as a cohesive, single, unitary display, without intervention on the part of the user and without requiring modification of the applications generating displayed output data. The system allows a user to interact with displayed windows without knowledge of the source of those windows, and changes to the window, either locally or remotely, are reflected in the corresponding display on the server or client.

In one aspect, the present invention relates to a system for incorporating windows from remote desktop environments into a local desktop environment. The system includes a local node, a local agent, a first remote node, and a first remote agent. The first remote node provides a first remote desktop environment, and the first remote agent monitors the first remote desktop environment for changes in the environment. The first remote node transmits messages to the local agent indicative of changes in the first remote desktop environment. The local agent receives the transmitted messages and commands the local node to modify a representation of a first remote window that is part of a local desktop environment. The local agent also monitors the local desktop and transmits messages to the remote agent indicative of a change in the local desktop. In some embodiments, the local node provides the local desktop environment.

In another aspect, the present invention relates to a method for incorporating windows from remote desktop environments into a local desktop environment. The method comprises the steps of: providing a local node hosting a local agent; receiving, by the local agent, a message indicating a change to windows included in a remote desktop environment; commanding, by the local agent, the local node to effect a corresponding change in the local desktop environment; monitoring, by the local agent, the local desktop; and transmitting, by the local node, messages to the remote node indicative of a change in the local desktop environment. The method may be embodied on an article of manufacture.

In yet another aspect, the present invention relates to an agent which incorporates windows from remote desktop environments into a local desktop environment. The agent includes a message receiving process capable of receiving messages indicating a change has occurred in a remote desktop environment. A command process effects changes to the local desktop environment responsive to messages received by the message receiving process. A monitor process monitors local desktop events. A transmission process transmits messages indicating occurrence of the local desktop event. The agent may be embodied on an article of manufacture.

In a further aspect, the present invention relates to a system for incorporating windows from a remote desktop into a local desktop. The system comprises a local node and a remote node connected by a communications link. The communications link includes a first virtual channel and a second virtual channel. The nodes exchange desktop information such as window position, window size, and Bordering of desktop windows, over the first virtual channel. The nodes exchange graphical information over the second virtual channel. In some embodiments, the first virtual channel and the second channel may be provided as a single virtual channel.

BRIEF DESCRIPTION OF THE DRAWINGS

The invention is pointed out with particularity in the appended claims. The advantages of this invention described above, and further advantages, may be better understood by reference to the following description taken in conjunction with the accompanying drawings, in which:

DETAILED DESCRIPTION OF THE INVENTION

Figure 1:
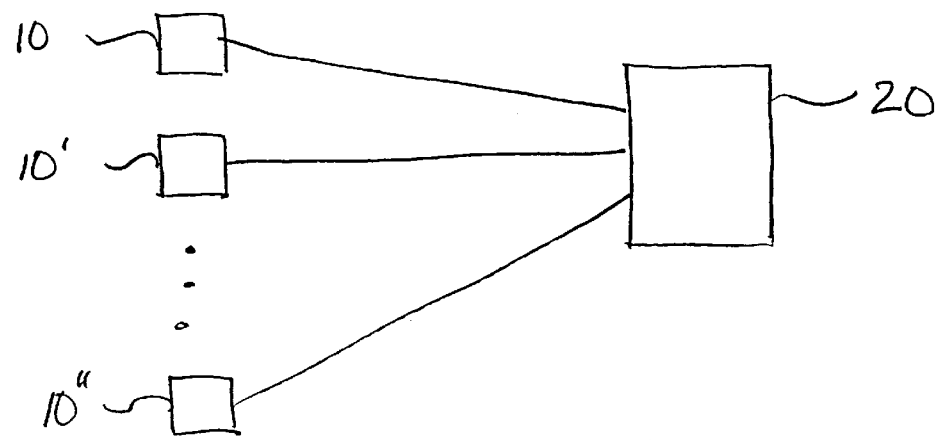
FIG. 1 is a functional block diagram of an embodiment of a client-server system.

Referring now to FIG. 1, a client-server system is shown in which server node 20 provides services for one or more client nodes 10. Client nodes may communicate with server node 20 via any of a number of industry-standard data communications protocols including, but not limited to, TCP/IP, IPX/SPX, NetBEUI, or serial protocols. Alternatively, client nodes 10 may connect to server node 20 using a proprietary data communications protocol such as the ICA protocol manufactured by Citrix Systems, Inc. of Fort Lauderdale, Fla. or the RDP protocol manufactured by Microsoft Corporation of Redmond, Wash. The actual connection between the client nodes 10 and the server node 20 may be physical cabling or it may be a wireless connection, such as infrared transmission.

Figure 2:
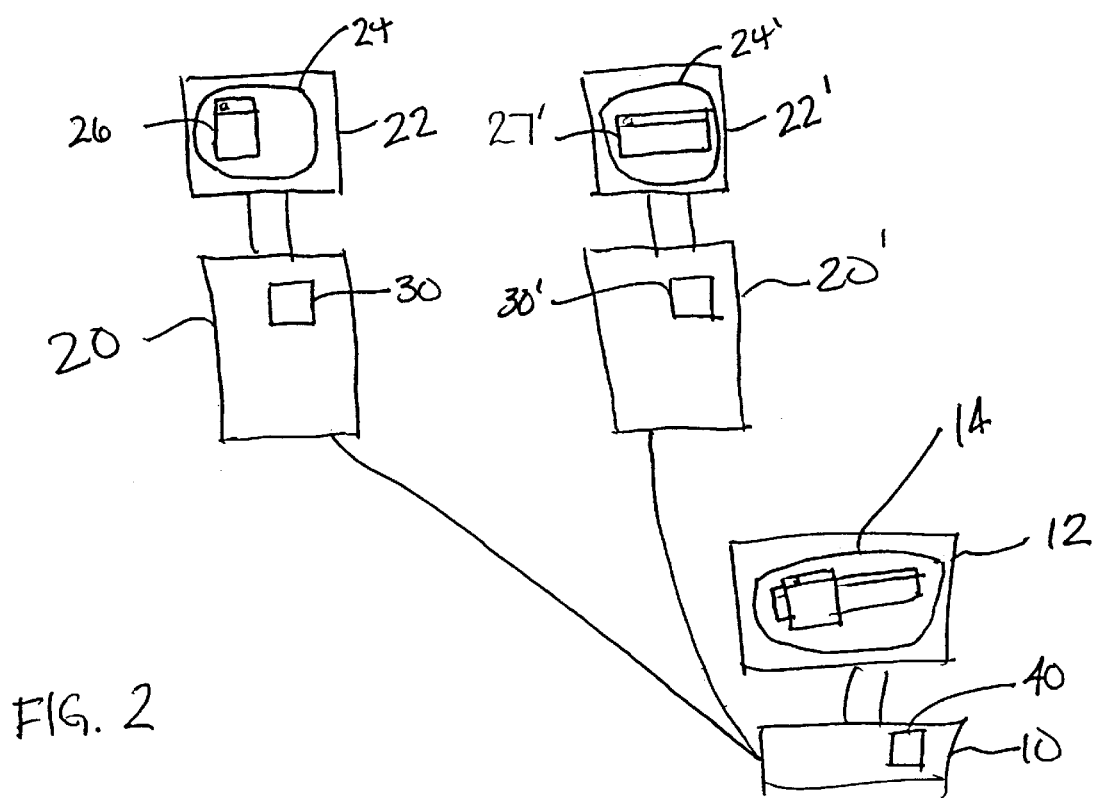
FIG. 2 is a functional block diagram of a client node connected to two separate server nodes.

FIG. 2 depicts a system in which a single client node 10 is connected to more than one server node 20, 20'. As shown in FIG. 2, client node 10 has an associated display 12. The display 12 may be used to display one or more components of a graphical user interface, such as windows and pull-down menus. The collection of graphical user interface components displayed to a user by the display 12 is generally referred to as the "desktop." As shown in FIG. 2, the local node 10 displays a local desktop environment 14 to a user. Local node 10 may provide at least a part of the local desktop environment 14 or local node 10 may simply display various desktop components received from other sources such as server nodes 20. As shown in FIG. 2, each server node 20, 20' has an associated display 22, 22' which also displays a desktop environment 24, 24'. It should be noted that display 22, 22' need not be a video display monitor. For example, display 22, 22' may simply be a bank of video RAM to which applications write the output of graphical procedure calls. FIG. 2 depicts an embodiment of a system in which each server node display 22, 22' displays one graphical user interface window 26, 27'.

Each server 20, 20' also includes at least one agent 30, 30'. In particular embodiments, each server 20, 20' includes one agent 30, 30' for each client 10 connected to the server 20, 20'. Client node 10 may also host an agent 40. In some embodiments, a client node 10 hosts a separate local agent 40 for each server to which the client node 10 is connected. In other embodiments, the client node 10 hosts a single agent 40 that manages connections to multiple server nodes 20. Each of the agents 30, 30', 40 may monitor their associated desktop environment 24, 24', 14 for windows which: change position; are opened; are closed; change size; are minimized; are maximized; or are brought to the top of the desktop, i.e., windows which gain focus that do not previously have focus. Each agent 30, 30', 40 transmits messages indicative of changes in their associated desktop 24, 24', 14 to other agents. For example, local agent 40 may receive messages transmitted from server node agents 30, 30'. The local agent 40 commands the client 10 to modify the local desktop environment 14 in response to the messages received from server agents 30, 30', that is, the local agent 40 issues commands to the client node 10 to conform the local desktop environment 14 to the server desktop environment 24. In other embodiments, server node agents 30, 30' receive messages from a local agent 40 and command the server 20, 20' to modify the server desktop environment 24, 24' in response to messages received from the local agent 40.

In one embodiment, the agents 30, 40 monitor changes to their associated desktop environment 24, 24' by periodically issuing one or more of a set of commands provided by the operating system that allow details of the graphical user interface desktop to be determined. For embodiments in which the agents 30, 40 reside on nodes that execute a version of the WINDOWS operating system, the agents 30, 40 may periodically issue the Enum Windows command to the WINDOWS operating system, which returns a list of all windows present on the desktop, together with information related to those windows. The agents 30, 40 can issue the Enum Windows command every 50 milliseconds, every 100 milliseconds, every 500 milliseconds, or at any period that allows the agent 30, 40 to rapidly determine when changes to its associated desktop environment have occurred without putting a significant computational burden on the node. In this embodiment, the agent 30, 40 maintains a data structure storing information about the desktop windows and compares the values returned by the Enum Windows command to the data structure to determine changes.

Information determined and stored by the agent 30, 30' can include the title bar associated with each window, the location of each window in the desktop environment 24, 24', the size of each window, and the z-order positioning of each window in the desktop environment 24, 24'. In another embodiment, the agent 30, 30', 40 monitors an intranode graphics message queue to determine changes to its associated desktop environment. Server agents 30, 30' monitor an intraserver message queue and local agent 40 monitors an intraclient message queue. In this embodiment, changes to the desktop environment 24, 24' are effected via messages sent to a graphics subsystem from system applications or the operating system itself. Thus, an application executing an a server 20, 20' would send a message to a graphics engine residing on the server 20, 20' in order to change the server desktop environment 24, 24'. Other commands which return graphical user interface data are readily apparent to those of ordinary skill in the art. For embodiments in which the agents 30, 40 reside on nodes executing a version of the WINDOWS operating system, the agents 30, 40 monitor the Windows Message Queue for messages affecting the desktop environment associated with the node on which the agent resides. Examples of such messages include: WM_SETFOCUS, which indicates to which window focus will be given (i.e., brought to the "top" of the desktop); WM_KILLFOCUS, which removes focus from an indicated window; and WM_WINDOWPOSCHANGING, which indicates a change in the position of a window. Other messages that can be posted to the Windows Message Queue are readily known to those of ordinary skill in the art.

Figure 3:
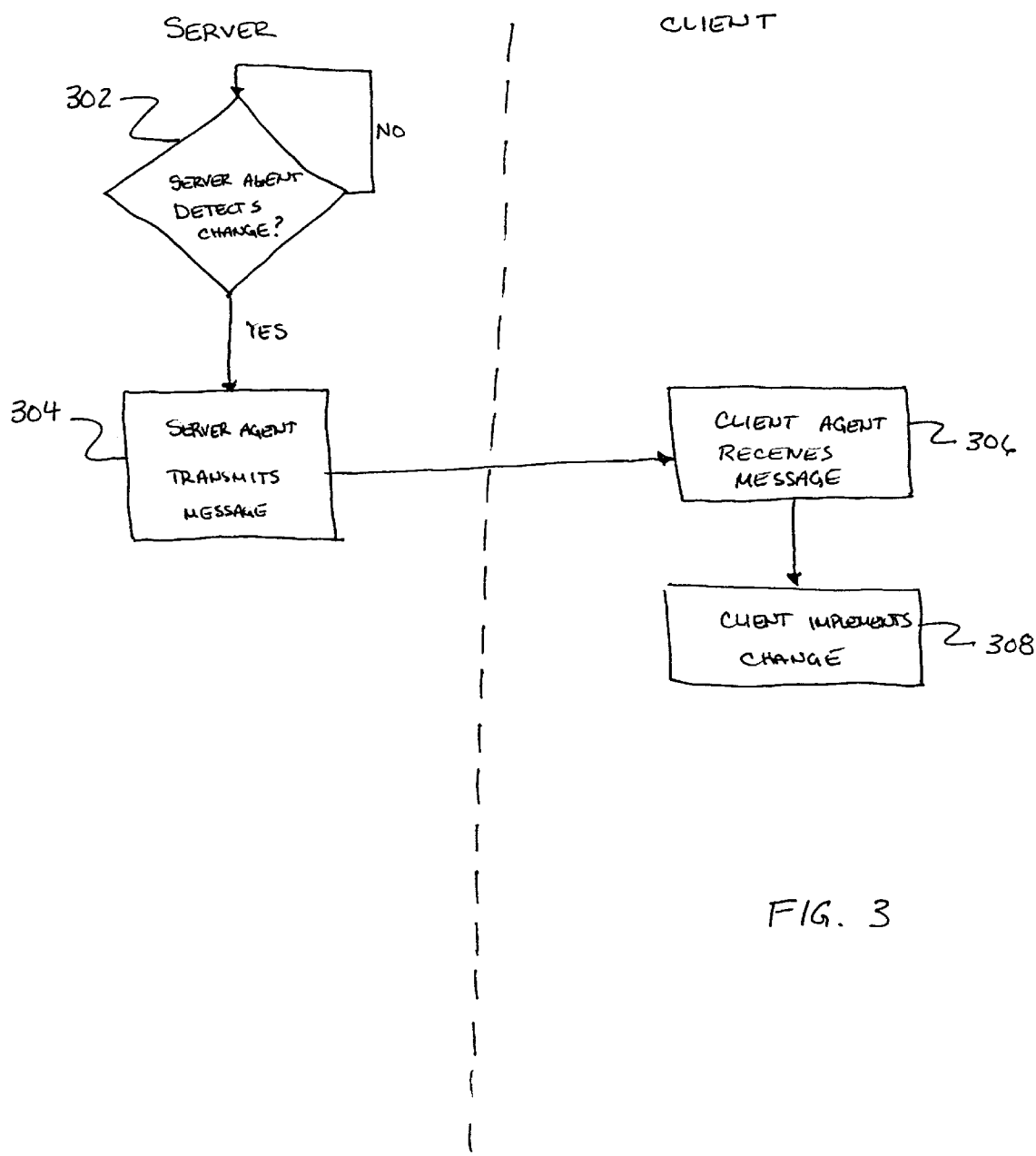
FIG. 3 is a flow diagram of the steps to be taken when a server agent detects a change in its associated desktop environment.

Referring now to FIG. 3, the steps taken during a server-initiated event are shown. The server agent 30 senses a change in its associated desktop (step 302). The server agent 30 may do this by intercepting a window event on the server message queue, or the agent 30 may determine a change in the desktop by comparing the results returned from serially issued operating system commands, as described above. The server agent 30 sends a message to a client agent 40 indicating the change in the server desktop 24 (step 304). For example, if a new window has been given focus, the server agent 30 can transmit a message to a client agent 40 indicating the identity of the new "top" window. In one embodiment, the server agent 30 broadcasts its message to all client agents 40 that exist in the system. Alternatively, the server agent 30 may transmit its message only to a predetermined subset of client agents 40. For example, when a client 10 makes a connection to a server 20, the client agent 40 may register with the server agent 30. In this embodiment, the server agent 30 would transmit change messages only to those client agents that have registered with the server.

The client agent 40 receives the transmitted message (step 306). In embodiments in which the server broadcasts commands, the client agent 40 must have some mechanism for determining whether a transmitted command affects its associated desktop 12. For example, the client agent 40 may maintain a list of servers to which it is connected. In these embodiments, the client agent 40 responds to messages broadcast by any server present in its list. For embodiments in which the server agent 30 does not broadcast messages, no such mechanism is necessary.

The client agent 40 implements a change to its associated desktop 14 responsively to the received message (step 308). The client agent 40 may accomplish this by directly issuing graphics Application Programming Interface commands that cause the client 10 to change the display of its associated desktop 14. Alternatively, the client agent 40 may issue GDI commands to change its associated desktop 14. In still other embodiments, the client agent 40 issues commands directly to the system, whether implemented in hardware or software, responsible for displaying graphics on the client 10.

Figure 4:
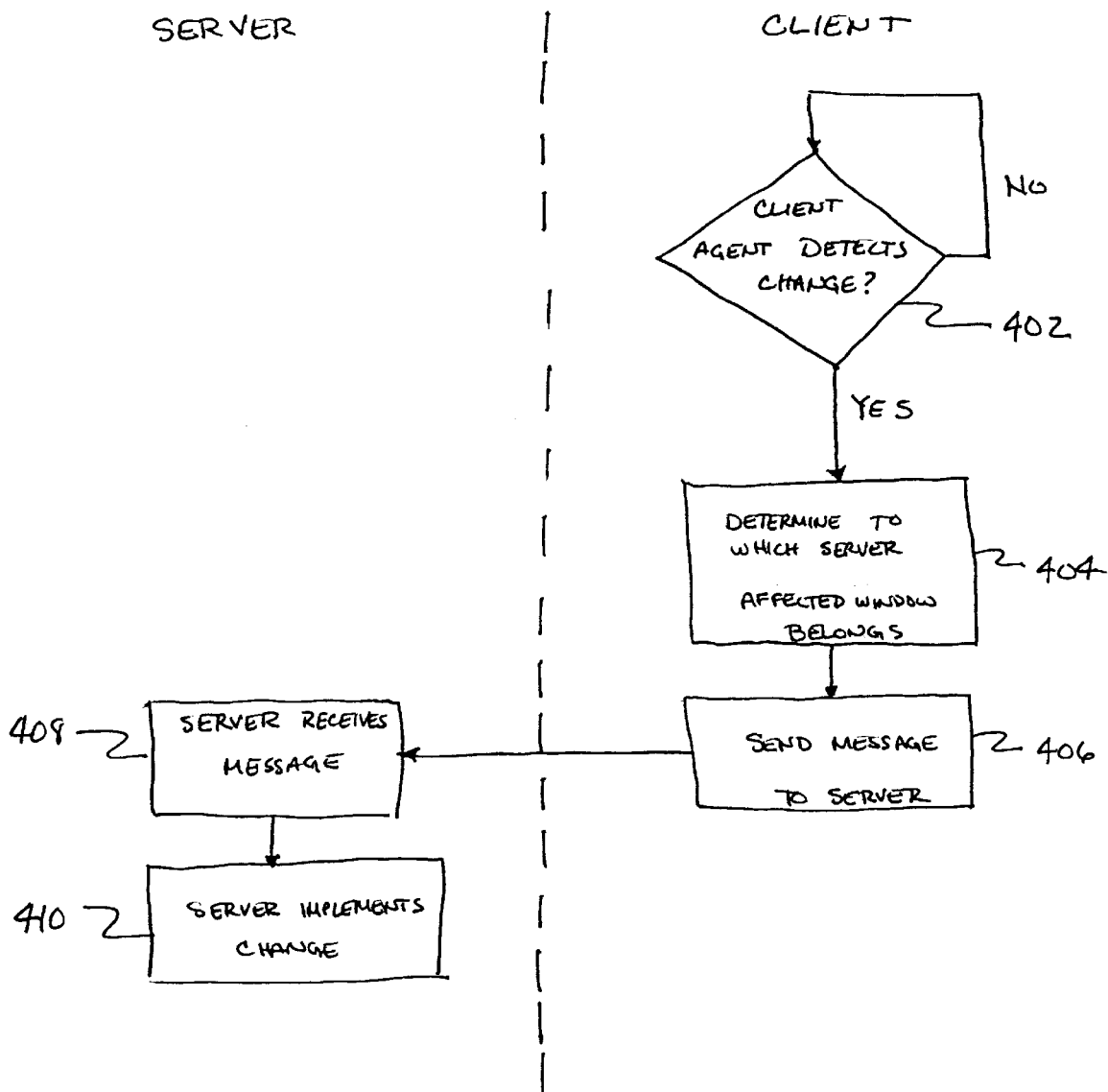
FIG. 4 is a flow diagram of the steps to be taken when a client agent detects a change in its associated desktop environment.

Referring now to FIG. 4, the steps taken when a client initiates a desktop change are shown. The client agent 40 senses a change in its associated desktop 14 (step 402). As noted above, this may be done on an event-driven basis or by polling the operating system operating on the client 10. The client agent 40 determines to which server 20 the affected window belongs (step 404). To facilitate this process, the client agent 40 may maintain a list that associates remote windows with a particular server 20. The client agent 40 then sends a message to the identified server 40 indicating the change in its desktop 14 (step 406). Alternatively, the client agent 40 may skip step 404 entirely and broadcast its change message to all servers 20. The server agent receives the transmitted message (step 408) and implements the change in its associated desktop (step 410), as described above.

In one particular embodiment, a client node 10 and a server node 20 communicate using the ICA protocol and the client node 10 and the server node 20 execute a version of the WINDOWS operating system. Client node 10 hosts a local agent 40 that may be provided as a dynamically linked library module. The server node 20 hosts a server agent 30 that may be provided as a separate thread.

In this embodiment, the local agent 40 and the server agent 30 exchange graphical data, i.e., the data actually displayed in each window on the desktop, via a first ICA virtual channel. Information about window positioning, window size, z-access ordering of window and other such information is communicated between the client node 10 and the server node 20 via a second ICA virtual channel. Throughout the description, when the client node 10 and the server node 20 are actively exchanging information via the second ICA virtual channel, the client will be referred to as being in "seamless windowing mode."

Figure 5:
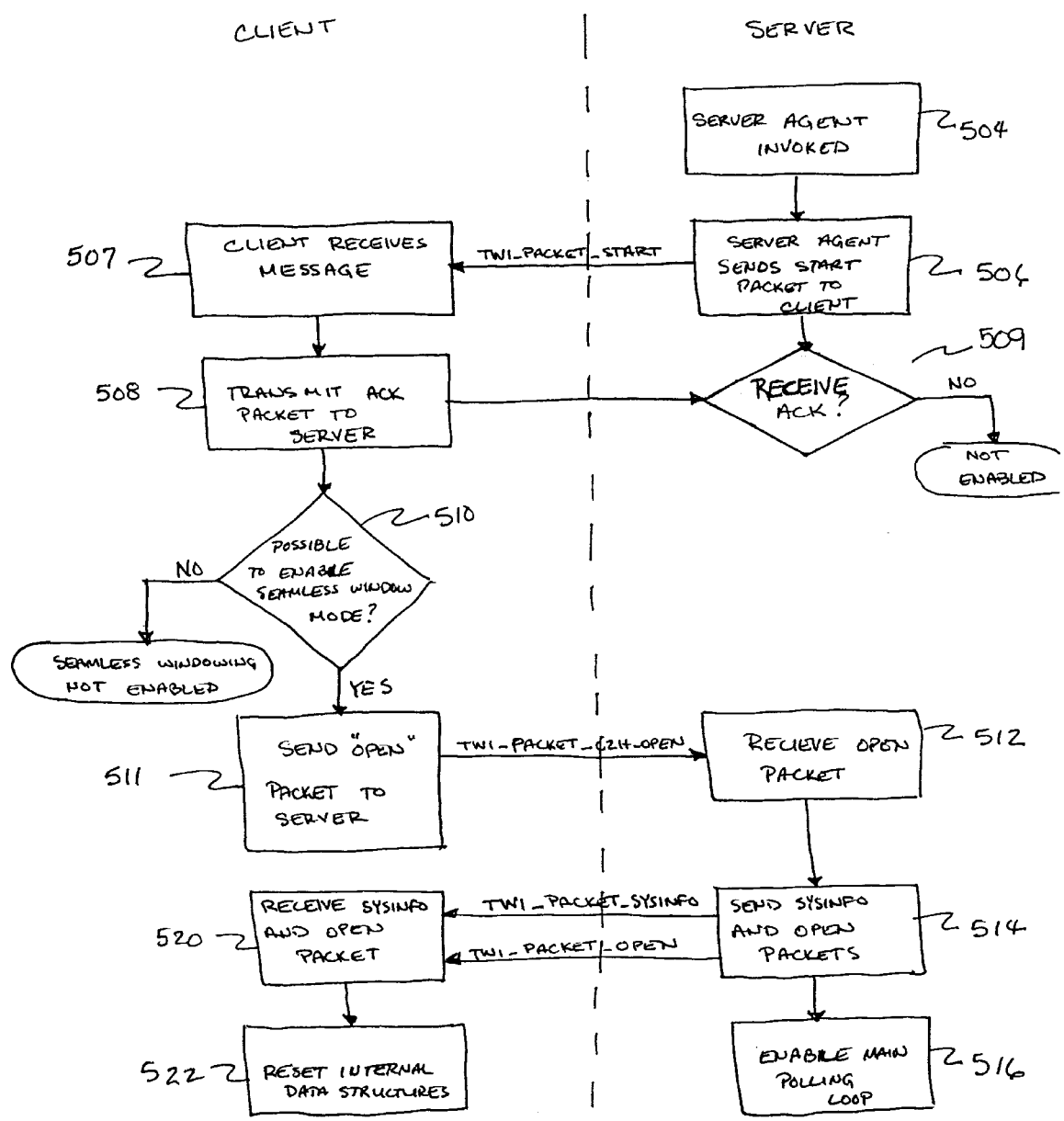
FIG. 5 is a flow chart of the steps to be taken to open a virtual channel between a client agent and a server agent.

Referring now to FIG. 5, the process for enabling seamless windowing mode between the local agent 40 and server agent 30 is shown. In this embodiment, all communication between a server agent and a client agent is packet-oriented and takes place over a dedicated ICA virtual channel, making the functioning of the agents 30, 40 independent from the underlying communication protocol. All packets start with packet type (1 byte), followed by packet data length (2 bytes, can be zero) and data (optional). Agents 30, 40 will try to send as much data in a single network packet as possible, but it will always send complete packets. That is, the size of seamless window virtual packets never exceeds the allowable size of an ICA packet. Packet flow control and delivery confirmation is implemented by the transport level of the ICA protocol. Individual packets are executed immediately on reception.

The client agent 40 waits for an initial packet from the server agent 30. After user logon to the server, a server agent 30 will be invoked (step 504).

The server agent sends a TWI_PACKET_START packet to the client agent 40, which includes some essential information about the server desktop environment (desktop resolution, desktop size, version number of ICA protocol supported by the server, etc.) (step 506). This packet is sent by the server agent 30 on initial connection or on reconnect, and is used to: (1) detect seamless windowing capabilities of the client; and (2) requests basic client information.

The client agent receives the TWI_PACKET_START packet (step 507) and responds with a TWI_PACKET_C2H_START_ACK packet, confirming TWI_PACKET_START and supplying client version/capabilities information (step 508). This packet is sent by the client agent 40 to confirm reception of TWI_PACKET_START packet and to send the requested basic client information to the server agent 30.

If there is no response from the client agent 40 (step 509), the server agent 30 assumes that the client is unable to enter seamless windowing mode, and the seamless windowing virtual channel is not used by the server node 20 to communicate window information. In this case, the server node 20 continues to communicate graphical data to the client node 10 via another virtual channel, and the client desktop displays the server desktop without incorporating windows from other nodes.

The client agent 40 uses the information sent by the server agent 30 in step 506 to determine if a seamless windowing session can be established between the server agent 30 and the client agent 40. In one embodiment, the client agent 40 compares information relating to the version of the virtual channel protocol supported by the server agent 30 to makes the determination If the client agent 40 determines that it is possible to enable seamless windowing mode (step 510), the client agent 40 sends a TWI_PACKET_C2H_OPEN packet to the server agent 30 (step 511). This packet requests that the server agent 30 enable seamless windowing mode.

On reception of a TWI_PACKET_C2H_OPEN packet (step 512) the server agent 40 (I) resets its internal data structures, (ii) sends a TWI_PACKET_SYSINFO packet to the client agent 40 to communicate some general information regarding the window settings on the server node 20 to the client agent 40, (iii) sends a TWI_PACKET_OPEN packet to the client agent 40 (step 514) indicating the establishment of seamless windowing mode, and (iv) enables its main polling loop (step 516) that will poll the operating system on the server node for desktop changes. If the client agent 40 and the server agent 30 do not support the same version of the seamless window protocol, the server agent 30 ignores the TWI_PACKET_C2H_OPEN packet.

On reception of TWI_PACKET_OPEN packet (step 520), the client agent 40 resets its internal data structures (step 522) and seamless windowing mode between the client agent 40 and the server agent 30 is established.

During a seamless windowing mode session, the server agent 30 will send window information such as window position, size, styles, window text, etc. for all top-level windows on the server node. Also, foreground window information is sent, i.e., which window on the server node desktop is the foreground window. In accordance with this information, the client agent 40 creates windows with the same size/position as the server node windows on the client node desktop. In some embodiments, window elements are transmitted as bitmaps from the server node 20. Examples of packets sent by the server agent 30 include: TWI_PACKET_CLOSE, which is sent to switch the client agent 40 out of seamless windowing mode and back to regular, or full screen, mode; that is, the client node 10 is switched back to displaying the server node desktop environment without incorporating windows from other desktop environments; TWI_PACKET_CREATEW, which is sent to create new windows on the client node 10; TWI_PACKET_DELETEW, which is sent to destroy a window on the client node 10; TWI_PACKET_CHANGEW, which is sent to change a window displayed by the local node 10; TWI_PACKET_SYSINFO, which is sent to report server node 20 system settings—normally it is sent only once, but the packet can be sent multiple times; TWI_PACKET_FOREGROUNDW, which is sent during normal seamless windowing mode operation to change the foreground window; TWI_PACKET_SETTOPW, which is sent during normal seamless windowing mode operation to change the top window, that is, to bring a new window to top; TWI_PACKET_SETFOCUS, which is sent during normal seamless windowing mode operation to change the focus window; TWI_PACKET_FOCUSACK, which is sent in response to TWI_PACKET_C2H_SETFOCUS (see below), and reports the result of a SetFocus attempt; and TWI_PACKET_SPA_STATUS, which is sent in response to TWI_PACKET_C2H_START_PUBLICAPP (see below), and is used to report the result of the requested operation.

Examples of packets that can be sent by the client agent 40 to the server agent 30 include: TWI_PACKET_C2H_PAUSE, which is sent to suspend the server agent 30, that is, the server agent 30 will stop sending window information, clear its internal data structure and send a TWI_PACKET_CLOSE packet (see above); TWI_PACKET_C2H_RESUME, which is sent to resume the server agent 30—the server agent 30 will clear its internal data structure, and send a TWI_PACKET_OPEN packet (see above); TWI_PACKET_C2H_SETPOS, which is sent to report window size/position change on the client node; TWI_PACKET_C2H_SETFOCUS, which is sent to report a change in the focus window on the client node; TWI_PACKET_C2H_RESTORE, which is sent to request restoration of a minimized window; TWI_PACKET_C2H_TERMINATE, which is sent to request termination of a program executing on the server node 20; TWI_PACKET_C2H_STARTAPP, which is sent to start a new application on the server node 20; TWI_PACKET_C2H_LOGOUT, which is sent to end the current session; TWI_PACKET_C2H_START_PUBLICAPP, which is sent to start a new published application on the server node; and TWI_PACKET_C2H_CLIENTINFO, which is sent to report client desktop settings to the server agent 30—this packet is generally sent on startup, but can also be used during seamless windowing session.

The client agent 40 will try to perform some operations (such as window move and resize) locally, sending update information back to the server node 40 afterwards. Proper window behavior is emulated by intercepting the WM_NCHITTEST message for the client-created windows.

Foreground window changes can happen on both the client node and the server node, so the client and server will negotiate and balance actual foreground window changes. For example, if the server node 20 changes its foreground window, that change should be properly represented on the client desktop. The server agent 30 sends information regarding the new foreground window to the client agent 40 using the TWI_PACKET_FOREGROUNDW packet. Similarly, if the client agent 40 detects a foreground window change on the client desktop, the client agent 40 sends information regarding the change to the server agent 30 and the server agent 30 implements the change on the server desktop.

When focus is taken away from a window representing a server window and is given to a local client window, the client notifies the server of the change and the server gives focus to an invisible window. For embodiments in which the client node 10 is connected to two server nodes 20, and focus is shifted from a window representing a window from the first server and is given to a window representing a window from the second server, the client sends a packet informing the current server that its window no longer has focus. Once the server responds by giving focus to an invisible window, the client agent 40 instructs the other server that its window now has focus on the local desktop.

In some embodiments, it is desirable to add some complexity to the agent's main polling loop to reduce network traffic. In these embodiments, the main polling loop includes a comparison between the current foreground window and the identity of the window last requested to be moved to the foreground. If the current foreground window matches the window identified in the most recent request, the agent does not need to send information acknowledging the change. This technique is useful in both server agent 30 and client agents 40.

Window z-ordering on the client is a superset of the server node z-ordering (client will always have more windows than the host). Server node Bordering is reproduced on the client by reproducing owner/owned relationship among windows and the TOP_MOST flag in the window style. Owner/owned relationships refer to windows which are children of other windows, such as dialog boxes associated with application windows. The dialog box is said to be owned by the application window, and the dialog box will always appear on top of its owner. The TOP_MOST flag indicates that a particular window should appear on "top" of the desktop, for example, the status bar in WINDOWS 95.

When a user disconnects, the server agent 30 switches itself to suspended mode, and will not send information to the client agent 40. On a reconnect, the server agent 30 sends a TWI_PACKET_START packet, reporting HostAgentState as "already running, reconnect."

Based on the version number of the protocol supported by the server the client will decide whether it is possible to enable seamless windowing mode (from the client point of view). If it is possible to switch to seamless windowing mode, the client agent 40 will send a TWI_PACKET_C2H_OPEN packet, asking the server agent 30 to enable seamless windowing mode.

Figure 6:
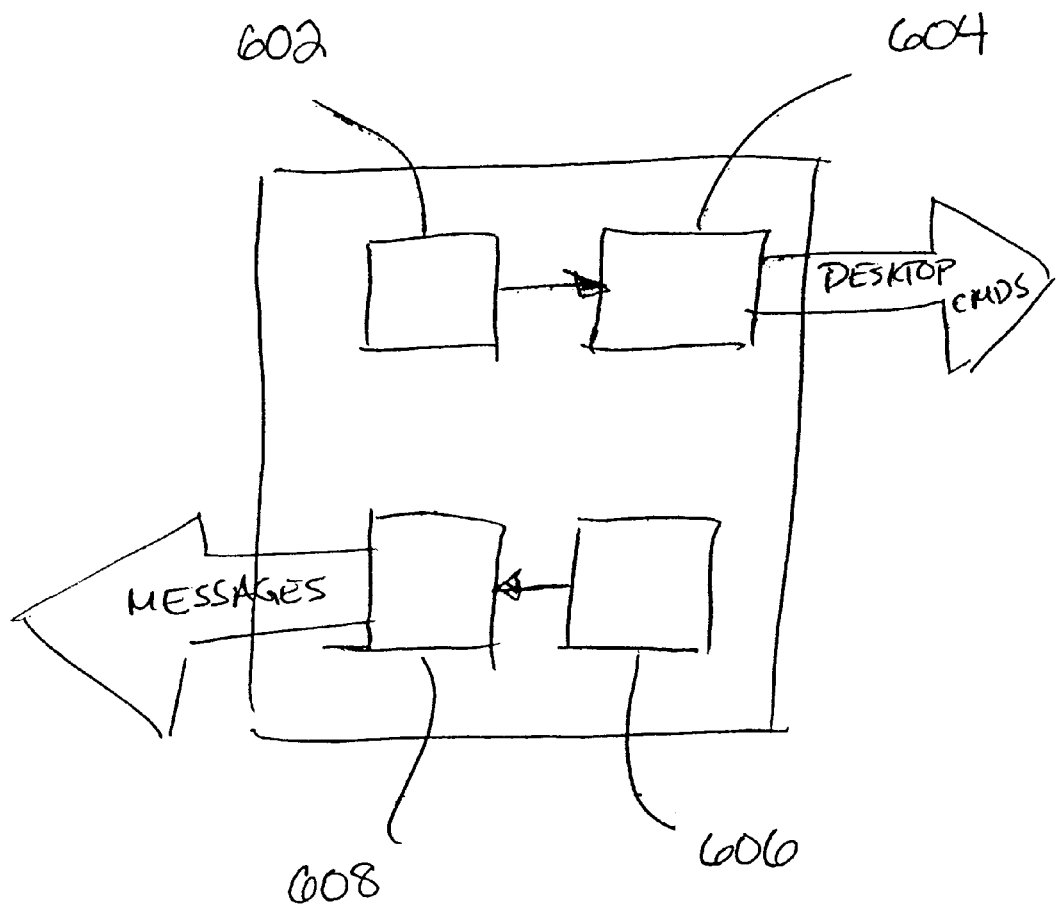
FIG. 6 is a functional block diagram of an agent.
Figure 1:
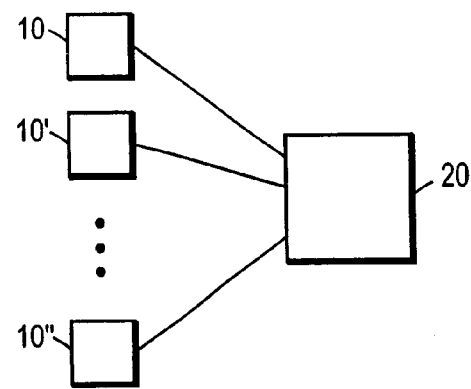
Figure 2:
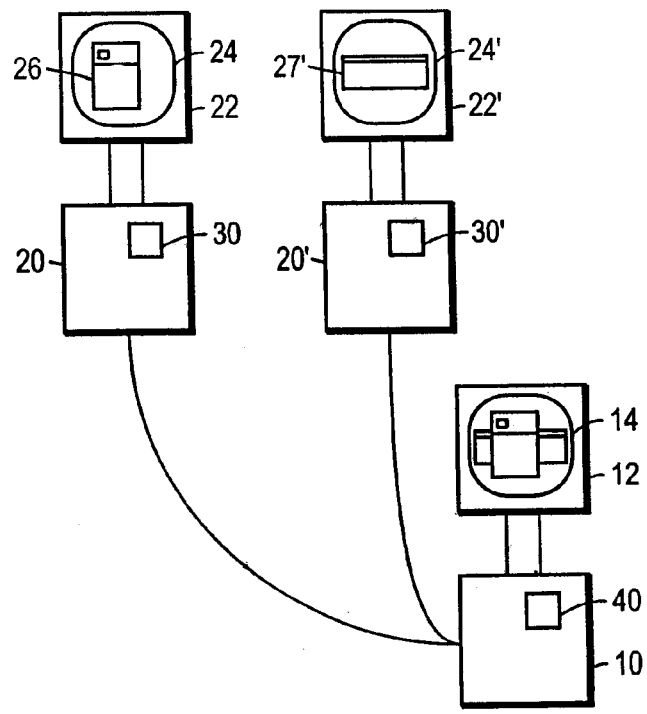
Figure 3:
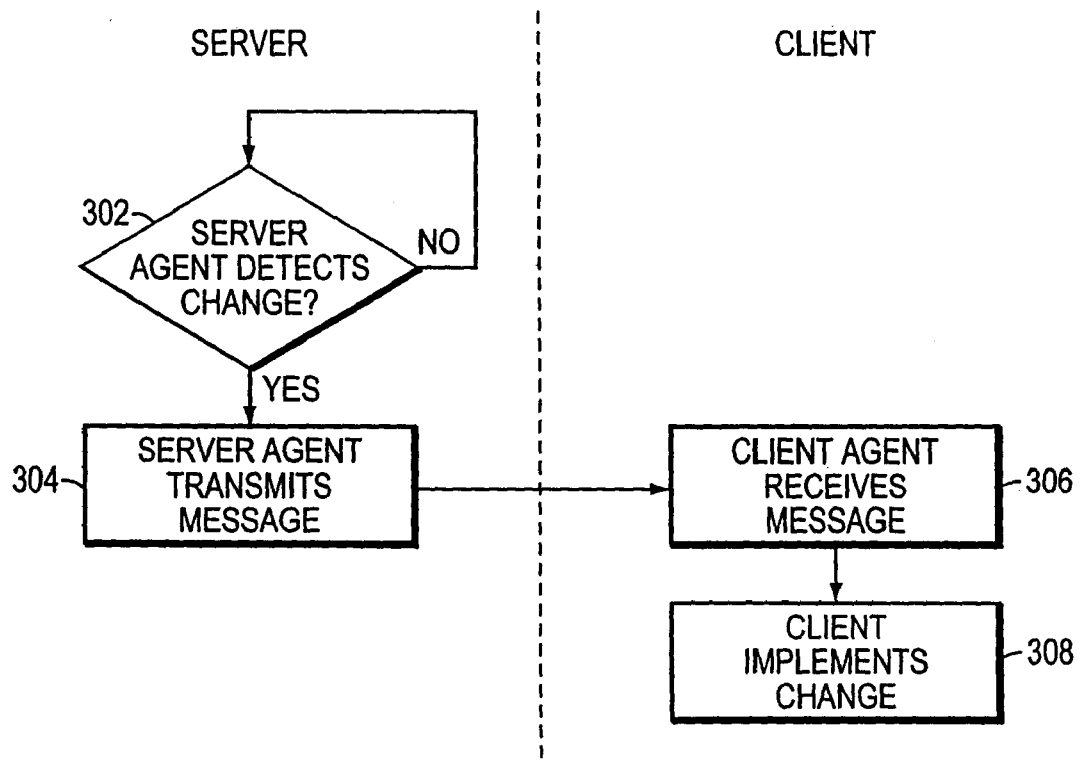
Figure 4:
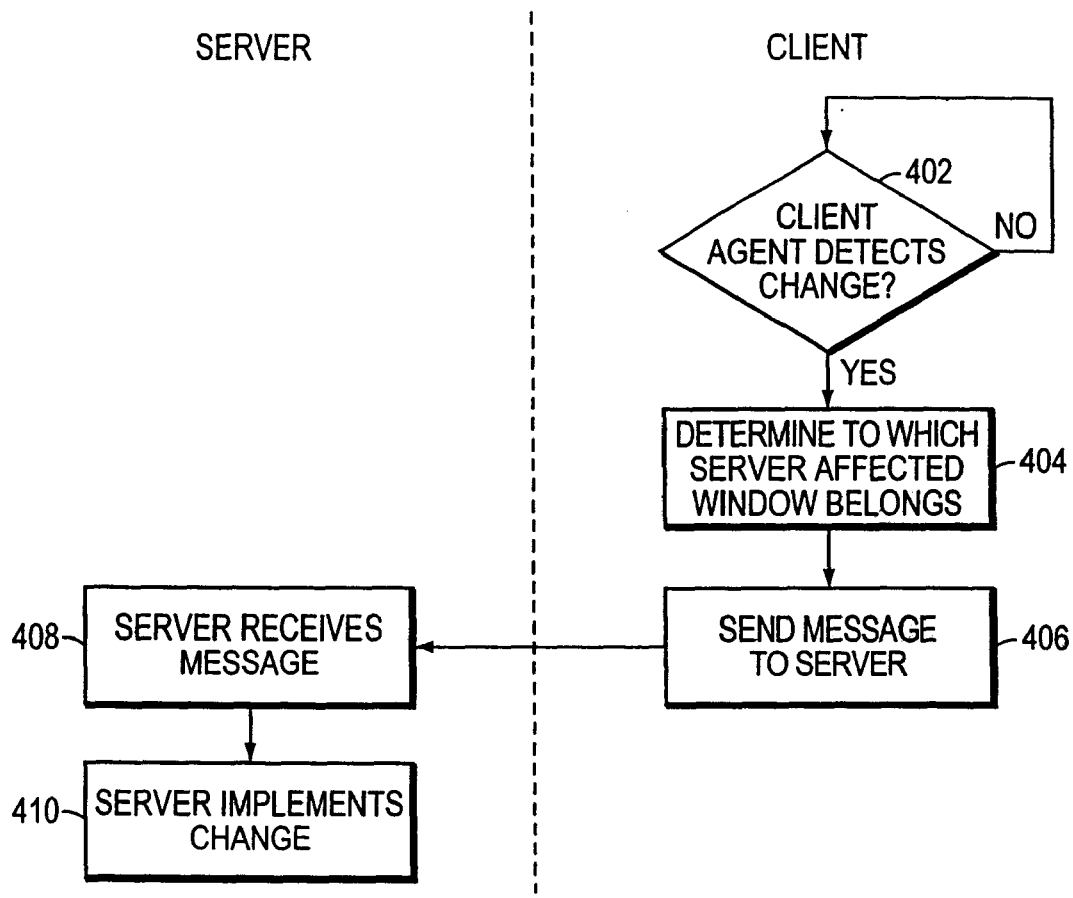
Figure 5:
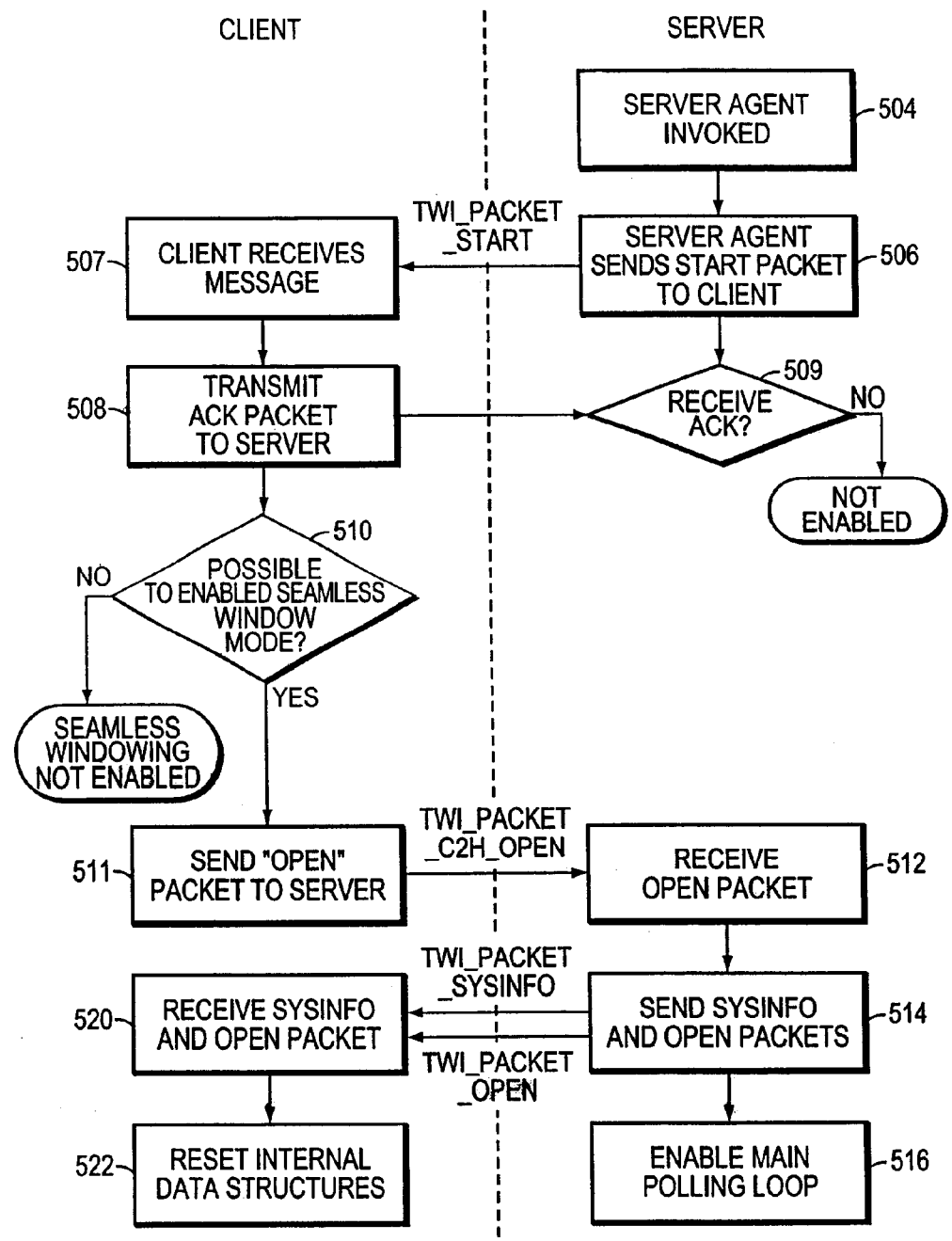
Figure 6:
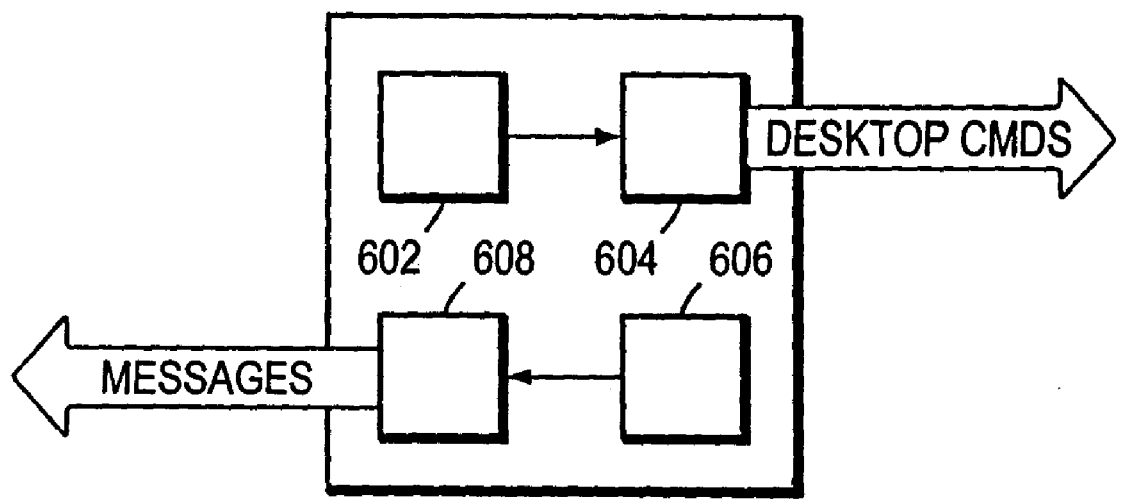

Each agent responsible for monitoring an associated desktop may be implemented as a stand-alone software routine (such as an executable file on DOS-based systems), a dynamically linked library routine (DLL), or as an integral piece of the operating system. Referring now to FIG. 6, and in brief overview, each agent includes a message receiving facility 602, a command facility 604, a monitor facility 606, and a message transmission facility 608. Agent-agent communication is full-duplex, i.e., agents can transmit and receive messages simultaneously. Thus, each facility can be implemented as a separately functioning code segment that operates independently of the other facilities. For example, message receiving facility 602 and command facility 604 can be implemented as separate threads which communicate with each other via a named pipe or shared memory. Use of a common data allows the message receiving facility 602 and the message transmitting facility 608 to be synchronized.

Message receiving facility 602 receives messages transmitted from other agents indicating changes in the desktop environments associated with those agents. Message receiving facility 602 may connect directly with the physical layer of the communications protocol the agents use to communicate, or the message receiving facility 602 may operate at a higher layer of the protocol by cooperating with one or more communications subsystems. For embodiments in which messages are broadcast by agents, the message receiving facility 602 has some mechanism for determining whether a broadcast message is intended for it. For example, the message receiving facility 602 may store a list of the windows which its associated desktop displays. The message receiving facility 602 would compare the target of any received message to its list of windows to determine whether or not to take action on the received message. The message receiving facility may be implemented as a blocking function. Alternatively, the message receiving facility can be implemented a call-back function invoked by the ICA virtual channel transport.

Once the message receiving facility 602 has determined that a received message is intended for its desktop, the command facility is invoked to effect the change indicated by the message to the associated desktop environment. The command facility 604 may be passed the received message facility, or the message receiving facility 602 may process the received message before communicating with the command facility 604. The command facility 604 may implement the desktop change indicated by the received message by issuing GDI commands. In other embodiments, the command facility 604 may issue commands directly to an associated graphics subsystem or may issue other graphics API commands.

During a seamless windowing session, a number of desktops are associated with a single client node—one desktop on the client itself and one desktop per server node 20 to which the client node 10 is connected. The client agent 40, in conjunction with the server agent 30, 30', creates a combined window list representing the z-order of all desktops. All participating desktops are "linked" together by the client agents 40 and the server agents 30, 30', and any z-order changes on any desktops will be propagated to other desktops.

In one embodiment, each server has knowledge only of its own graphical desktop representation and the server desktops are individually represented within the client. The client display is updated by combining all server and client desktop images into a single display image based on the window information that has been obtained from each server node 20, 20' by the client agent 40. The resulting image is displayed at the client node 10.

The combining process involves building a common window list based on the windows information exchanged by all agents. Using the combined window list, the graphical desktop data is clipped and merged for representation by the client node 10. The node takes care of "clipping" displayed windows resulting from the commands issued by the command facility 604. Such "clipping" functions are well-known to those of ordinary skill in the art. In some embodiments, however, the command facility 604 maintains a shadow bitmnap of clipped windows. That is, the command facility 604 maintains a bit image of windows that are obscured by other windows. This allows the agent to change its associated desktop without requiring it to reload the window image of an obscured window from the appropriate source. In other embodiments, the node determines whether graphical data is obscured at the time it is received. If it is, the node ignores the received graphical data. If it is not, the node displays the data. The node makes a determination as to whether the graphical data is obscured by applying clipping functions.

Monitoring facility 606 monitors the desktop associated with the agent. Monitoring facility 606 may monitor the desktop by periodically issuing commands provided by the operating system executing on the node which return information about the node's desktop. Alternatively, the monitoring facility 506 may watch for messages posted to an intranode message queue. As noted above, in one particular embodiment the monitoring facility 606 monitors the Windows Message Queue. Once a desktop change occurred, the message transmission facility 608 transmits a message indicating the change that has occurred. In some embodiments, the message transmission facility 608 broadcasts notification of the change.

In one embodiment, message transmission facility 608 can be implemented in the form of non-blocking function, that can be called from any window procedure. If the function can not send a data packet immediately (for example, the communication subsystem has no buffer space), a timer will be set and retry attempts will be done until the send succeeds.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

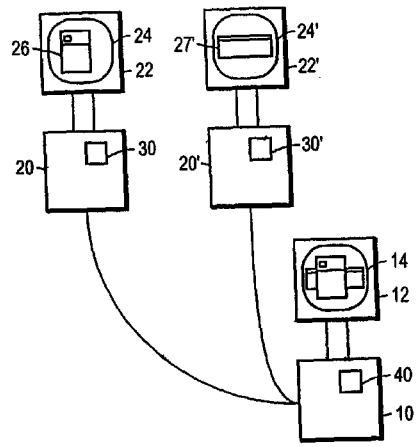

What is claimed is:

1. A system for incorporating at least one remote window from a remote desktop environment into a local desktop environment, the system comprising:
   a first virtual channel coupled to the remote desktop environment and conveying graphical data associated with the remote window;
   a second virtual channel coupled to the remote desktop environment and conveying window attribute data associated with the remote window; and
   a local agent coupled to the remote desktop environment via the first and second virtual channels, the local agent directing the formation of a corresponding window in the local desktop environment, the corresponding window displaying the graphical data conveyed by the first virtual channel in accordance with the window attribute data conveyed by the second virtual channel.

2. The system of claim 1 further comprising a combined windows list being formed and maintained by the local agent, the combined windows list representing a modifiable z-order of the corresponding window in the local desktop environment.

3. The system of claim 1 wherein the window attribute data associated with the remote window and conveyed by the second virtual channel includes the size and z-order of the remote window.

4. The system of claim 1 further comprising a local operating system forming the local desktop environment, the local agent periodically polling the local operating system to detect an attribute change in the corresponding window, wherein the local agent transmits a message to the remote desktop environment indicative of the attribute change.

5. The system of claim 1 wherein the corresponding window exhibits window attribute data substantially similar relative to the local desktop environment as the window attribute data of the remote window relative to the remote desktop environment.

6. The system of claim 1 further comprising a plurality of communication links coupling the local desktop environment with a plurality of remote desktop environments, the communication links including first and second virtual channels conveying graphical and window attribute data associated with remote windows from the plurality of remote desktop environments to the local agent, wherein the local agent forms corresponding windows in the local desktop environment corresponding to each of the plurality of remote windows.

7. A method of incorporating at least one remote window from a remote desktop environment into a local desktop environment, the method comprising the steps of:

receiving graphical data associated with the remoted window via a first virtual channel coupled to the remote desktop environment;

receiving window attribute data associated with the remote window via a second virtual channel coupled to the remote desktop environment; and forming a corresponding window in the local desktop environment, the corresponding window displaying the graphical data received from the first virtual channel in accordance with the window attribute data received from the second virtual channel.

8. The method of claim 7 further comprising the step of forming a combined windows list storing at least some of the window attribute data.

9. The method of claim 7 further comprising the steps of:

polling a local operating system associated with the local desktop environment to detect an attribute change in the corresponding window; and transmitting a message to the remote desktop environment indicative of the detected attribute change.

10. The method of claim 7 wherein the corresponding window exhibits window attribute data substantially similar relative to the local desktop environment as the window attribute data of the remote window relative to the remote desktop environment.

11. A system for incorporating at least one remote window from a remote desktop environment into a local desktop environment, the system comprising:

a first virtual channel coupled to the local desktop environment and conveying graphical data associated with the remote window;

a second virtual channel coupled to the local desktop environment and conveying window attribute data associated with the remote window; and a remote agent associated with the remote desktop environment and coupled to the local desktop environment via the first and second virtual channels, the remote agent transmitting messages to the local desktop environment directing the formation of a corresponding window in the local desktop environment, the corresponding window displaying the graphical data conveyed by the first virtual channel in accordance with the window attribute data conveyed by the second virtual channel.

12. The system of claim 11 further comprising a combined windows list formed in response to the messages transmitted by the remote agent and including at least some of the window attribute information conveyed via the second virtual channel.

13. The system of claim 11 wherein the window attribute data associated with the remote window and conveyed by the second virtual channel includes the size and z-order of the remote window.

14. The system of claim 11 further comprising a remote operating system forming the remote desktop environment, the remote agent periodically polling the remote operating system to detect an attribute change in the remote window, wherein the remote agent transmits a message to the local desktop environment indicative of the attribute change.

15. The system of claim 11 wherein the corresponding window exhibits window attribute data substantially similar relative to the local desktop environment as the window attribute data of the remote window relative to the remote desktop environment.

16. The system of claim 11 further comprising a plurality of communication links coupling the remote desktop environment with a plurality of local desktop environments, the communication links including first and second virtual channels conveying graphical and window attribute data associated with the remote window from the remote desktop environment to the plurality of local desktop environments, wherein the local desktop environments form corresponding windows corresponding to the remote window.

17. A method of incorporating at least one remote window from a remote desktop environment into a local desktop environment, the method comprising the steps of:

transmitting graphical data associated with the remote window via a first virtual channel coupled to the local desktop environment;

transmitting window attribute data associated with the remote window via a second virtual channel coupled to the local desktop environment; and transmitting messages to the local desktop environment directing the formation of a corresponding window in the local desktop environment, the corresponding window displaying the graphical data transmitted via the first virtual channel in accordance with the window attribute data transmitted via the second virtual channel.

18. The method of claim 17 further comprising the step of forming a combined windows list storing at least some of the window attribute data in response to the transmitted messages.

19. The method of claim 17 further comprising the steps of:

polling a remote operating system associated with the remote desktop environment to detect an attribute change in the remote window; and transmitting a message to the local desktop environment indicative of the detected attribute change.

* * * * *

UNITED STATES PATENT AND TRADEMARK OFFICE
CERTIFICATE OF CORRECTION

PATENT NO. : 6,437,803 B1
DATED : August 20, 2002
INVENTOR(S) : Anatoliy Panasyuk et al.

It is certified that error appears in the above-identified patent and that said Letters Patent is hereby corrected as shown below:

Title page showing the illustrative figures should be deleted to be replaced with the attached title page.

Drawings sheets, consisting of Figs. 1 - 6, should be deleted to be replaced with the drawing sheets, consisting of Figs. 1 - 6, as shown on the attached page.

Column 2,
Lines 37-38, "Bordering" should be -- Z-ordering --;

Column 8,
Line 32, "Bordering" should be -- Z-ordering --; and

Column 11,
Line 29, "the remoted" should be -- the remote --.

Signed and Sealed this

Twenty-second Day of April, 2003

JAMES E. ROGAN
*Director of the United States Patent and Trademark Office*

(12) United States Patent
Panasyuk et al.

(10) Patent No.: US 6,437,803 B1
(45) Date of Patent: *Aug. 20, 2002

(54) SYSTEM AND METHOD FOR COMBINING LOCAL AND REMOTE WINDOWS INTO A SINGLE DESKTOP ENVIRONMENT

(75) Inventors: Anatoliy Panasyuk, West Ryde; Martin Duursma, West Pennant Hills, both of (AU)

(73) Assignee: Citrix Systems, Inc., Ft. Lauderdale, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,898

(22) Filed: May 29, 1998

(51) Int. Cl.$^7$ ............................................. G09G 5/00
(52) U.S. Cl. ................................... 345/733; 345/750
(58) Field of Search ............................ 345/340, 326, 345/329, 332, 339, 302, 333, 330, 331, 781, 744, 759, 717, 740, 733–738, 748, 750, 751, 804, 764, 765

(56) References Cited

U.S. PATENT DOCUMENTS

| | | | |
|---|---|---|---|
| 4,387,425 A | 6/1983 | El-Gohary | 364/200 |
| RE32,632 E | 3/1988 | Atkinson | 340/709 |
| 4,779,189 A | 10/1988 | Legvold et al. | 364/200 |
| 4,860,247 A | 8/1989 | Uchida et al. | 364/900 |
| 4,903,218 A | 2/1990 | Longo et al. | 364/521 |
| 4,937,036 A | 6/1990 | Beard et al. | 340/706 |
| 4,949,281 A | 8/1990 | Hillenbrand et al. | 364/518 |
| 4,958,303 A | 9/1990 | Assarpour et al. | 364/521 |
| 4,974,173 A * | 11/1990 | Stefik et al. | 345/331 |
| 5,031,089 A | 7/1991 | Liu et al. | 364/200 |
| 5,062,060 A * | 10/1991 | Kolnick | 345/339 |

(List continued on next page.)

FOREIGN PATENT DOCUMENTS

| | | |
|---|---|---|
| EP | 0381645 A2 | 8/1990 |
| EP | 0384339 A3 | 8/1990 |

(List continued on next page.)

OTHER PUBLICATIONS

IBM Technical Disclosure Bulletin, "Remote Desktop Environments Reflected in Local Desktop Windows", Mar. 1993.*

Bruce Mann, et al.; *Terminal Servers on Ethernet Local Area Networks;* Digital Technical Journal, No. 3, Sep. 1986; pp. 73–87.

(List continued on next page.)

*Primary Examiner*—Raymond J. Bayerl
*Assistant Examiner*—Tadesse Hailu
(74) *Attorney, Agent, or Firm*—Testa Hurwitz & Thibeault, LLP

(57) ABSTRACT

A system for incorporating windows from remote desktop environments into a local desktop environment includes a local node, a local agent, a first remote node, and a first remote agent. The first remote node provides a first remote desktop environment, and the first remote agent monitors the first remote desktop environment for changes in the environment. The first remote node transmits messages to the local agent indicative of changes in the first remote desktop environment. The local agent receives the transmitted messages and commands the local node to modify a representation of a first remote window that is part of a local desktop environment. The local agent also monitors the local desktop and transmits messages to the remote agent indicative of a change in the local desktop. In some embodiment, the local node provides the local desktop environment. Local agents can be embodied on articles of manufacture.

19 Claims, 5 Drawing Sheets